UNITED STATES PATENT OFFICE.

QUINTIN MARINO AND EDWARD WILLIAM BARTON-WRIGHT, OF LONDON, ENGLAND.

PROCESS OF AGGLUTINIZING ACTIVE MATERIAL FOR ELECTRIC ACCUMULATORS.

No. 911,141.　　　Specification of Letters Patent.　　　Patented Feb. 2, 1909.

Application filed December 17, 1906. Serial No. 348,233.

*To all whom it may concern:*

Be it known that we, QUINTIN MARINO, engineer, residing at 28 Montague street, Russell Square, W. C., in the county of London, England, and EDWARD WILLIAM BARTON-WRIGHT, engineer, residing at 1 Albermarle street, Piccadilly, W., in the county of London, England, both subjects of the King of Great Britain and Ireland, have invented a certain new and useful Process of Agglutinizing Active Material for Electric Accumulators, of which the following is a specification.

This invention relates to a process for agglutinizing the active material used in electric accumulators and producing thereby a paste which will adhere to the sheet of lead or to the cells, grids or other similar metal plates or supports used in such accumulators or batteries. In accordance with this invention the said agglutinant is formed of the following composition and treatment of materials combined or mixed together in or about the following proportion, viz:—To a given quantity of castor oil is added from five to six per cent. of its weight of finely powdered litharge, and from three to four per cent. of manganese peroxid. This mixture is boiled until reduced to about one-half of its original volume in any suitable vessel, which latter having been removed from the fire the said mixture is allowed to clarify by settling. The dark gray powder, precipitated at the bottom of the vessel, is then separated from the oil by decantation or filtration. The oil is dissolved by sufficient hydro-carbon solvent, to wit benzol or alcohol to dissolve the same. The said oil solution is then mixed with more litharge in the proportion of about 10% of oil solution to 90% of litharge the said mixture being made into paste by adding dilute sulfuric acid in the proportion of about one part of acid to six parts of water. The oil solution in this condition constitutes the agglutinant which upon being added to the active material enables the same to be thoroughly kneaded. The paste so formed is compressed and heaped against the roughened surfaces or cells of the lead plates or grids used in the accumulator so as to cause it to adhere firmly, the said surfaces being previously freed from grease by means of benzin or the like. In this manner the molecules of paste are, so to speak, welded to the sheet or surface of lead, by which means the continuity of the solid material is insured, thereby obviating vacant spaces which in filling with the electrolytic liquid, would gradually force before them the artificial deposit of active oxids and would consequently diminish their adhesion to the lead support. When once this adhesion is materially lessened or destroyed, local reactions, on the one hand, between the support and the substance with which it is provided, take place, and on the other hand the surface of the support itself participating in the electrochemical reactions, is converted into active material effecting a condition different from the transformed artificial deposit. By means of our invention this defect is obviated by the use of our improved paste and there is not so much "forming" required in the construction of the accumulator.

Having now fully described the nature of our said invention, what we claim and desire to secure by Letters Patent is:—

The improved process of agglutinizing active material paste for electric accumulators, consisting in mixing castor oil with a small quantity of finely powdered litharge and manganese peroxid, boiling the mixture and allowing the same to clarify, decanting the oil so formed from the pulverulent precipitate, dissolving said oil in a hydro-carbon solvent, mixing the oil solution with a bulk of litharge and adding acidulated water to form a paste.

In witness whereof we have hereunto set our hands in the presence of two witnesses.

QUINTIN MARINO.
　　　EDWARD WILLIAM BARTON-WRIGHT.

Witnesses:
　　FREDERICK MICAH MELLOR,
　　JOHN JAMES ROWLEY.